(12) United States Patent
Mietschnig

(10) Patent No.: US 10,435,278 B2
(45) Date of Patent: Oct. 8, 2019

(54) MOBILE MACHINE

(71) Applicant: Liebherr-Werk Nenzing GmbH, Nenzing (AT)

(72) Inventor: Walter Mietschnig, Brand (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 127 days.

(21) Appl. No.: 15/661,701

(22) Filed: Jul. 27, 2017

(65) Prior Publication Data

US 2018/0029852 A1    Feb. 1, 2018

(30) Foreign Application Priority Data

Jul. 29, 2016  (DE) .................. 20 2016 004 687 U

(51) Int. Cl.
| | |
|---|---|
| *B66C 23/78* | (2006.01) |
| *B66C 23/36* | (2006.01) |
| *B66C 23/76* | (2006.01) |
| *B66C 23/80* | (2006.01) |
| *B62D 11/20* | (2006.01) |
| *B62D 55/084* | (2006.01) |

(52) U.S. Cl.
CPC .............. *B66C 23/78* (2013.01); *B62D 11/20* (2013.01); *B62D 55/084* (2013.01); *B66C 23/36* (2013.01); *B66C 23/76* (2013.01); *B66C 23/80* (2013.01)

(58) Field of Classification Search
CPC ......... B66C 23/78; B66C 23/80; B66C 23/76; B66C 23/36; B62D 11/20; B62D 55/084
See application file for complete search history.

(56) References Cited

U.S. PATENT DOCUMENTS

| | | | | |
|---|---|---|---|---|
| 3,021,016 | A * | 2/1962 | Noll ........................ | B66O 23/80 212/304 |
| 4,394,911 | A * | 7/1983 | Wittman ................. | B66O 23/84 212/253 |
| 4,446,976 | A | 5/1984 | Imerman et al. | |
| 4,579,234 | A * | 4/1986 | Delago ................... | B66O 23/36 212/178 |
| 5,293,949 | A * | 3/1994 | Zimmermann ......... | E02F 9/024 180/9.48 |
| 6,588,521 | B1 * | 7/2003 | Porubcansky .......... | B66O 23/36 180/9.1 |
| 7,677,861 | B1 | 3/2010 | Fehringer | |
| 9,238,945 | B2 | 1/2016 | Buckingham et al. | |
| 2009/0107946 | A1* | 4/2009 | Karp ...................... | B66O 23/80 212/302 |

(Continued)

FOREIGN PATENT DOCUMENTS

DE    10 2005 047 745 A1    3/2007
JP        10265176 A   *  10/1998

*Primary Examiner* — Darlene P Condra
(74) *Attorney, Agent, or Firm* — Dilworth & Barrese, LLP

(57) ABSTRACT

The present invention relates to a mobile machine, in particular a crawler crane, comprising: an undercarriage with a tracklaying gear, and an uppercarriage which is rotatably mounted with respect to the undercarriage, wherein the tracklaying gear includes two crawler supports aligned parallel to each other, along whose longitudinal direction a crawler chain each is movably arranged, wherein one cantilever arm each is provided on the inner sides of the crawler supports facing each other, and at the distal end of the respective cantilever arm a support cylinder is arranged.

8 Claims, 17 Drawing Sheets

(56) References Cited

U.S. PATENT DOCUMENTS

2011/0031202 A1* 2/2011 Pech ..................... B66O 23/76
                                              212/178
2011/0049075 A1* 3/2011 Willim .................. B66O 23/74
                                              212/279

* cited by examiner

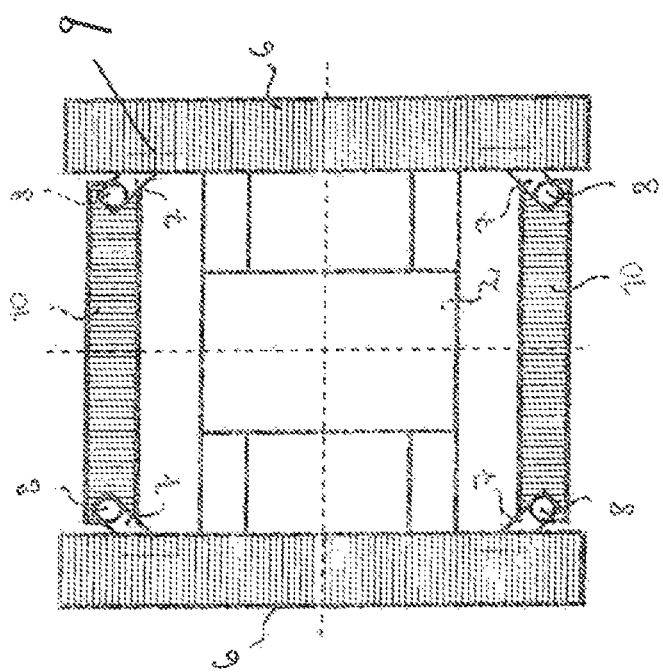

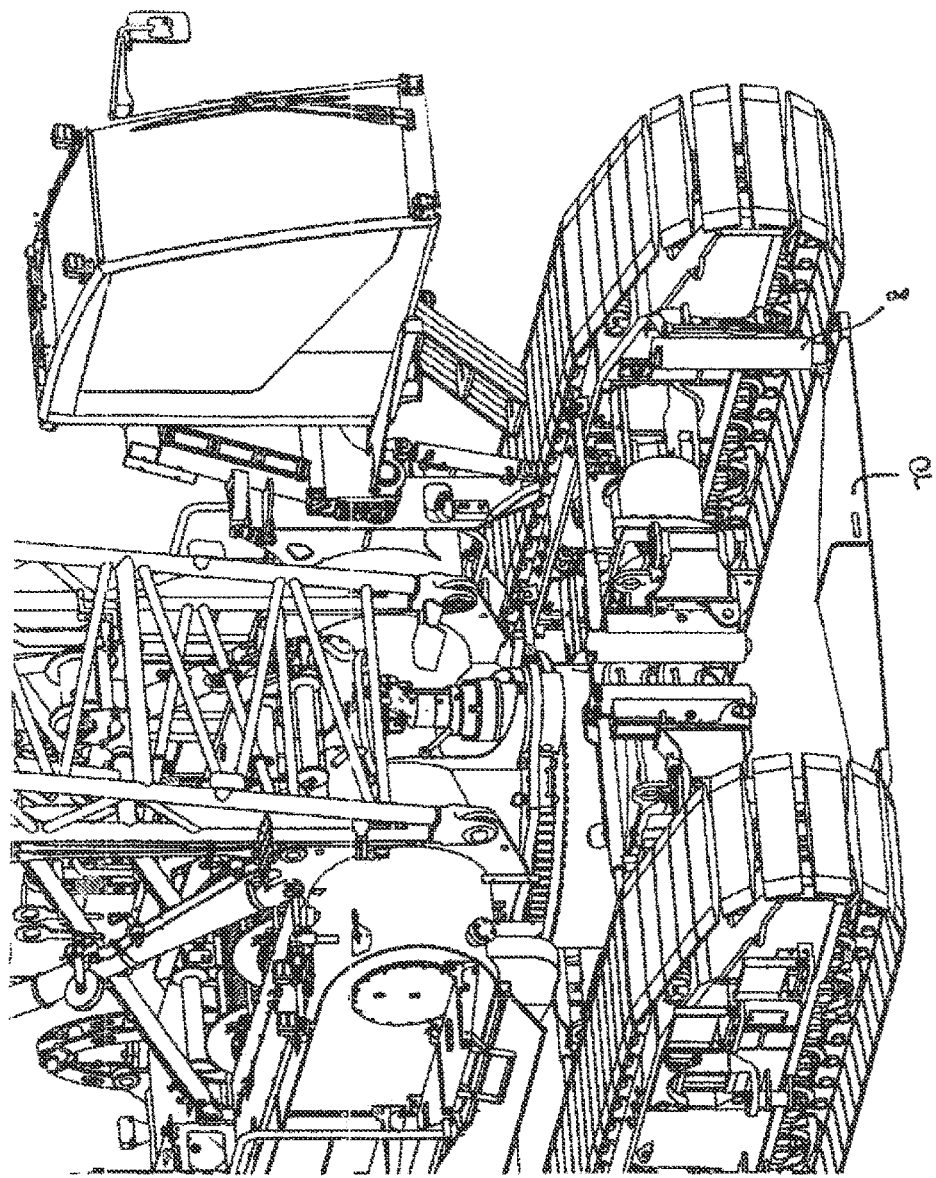

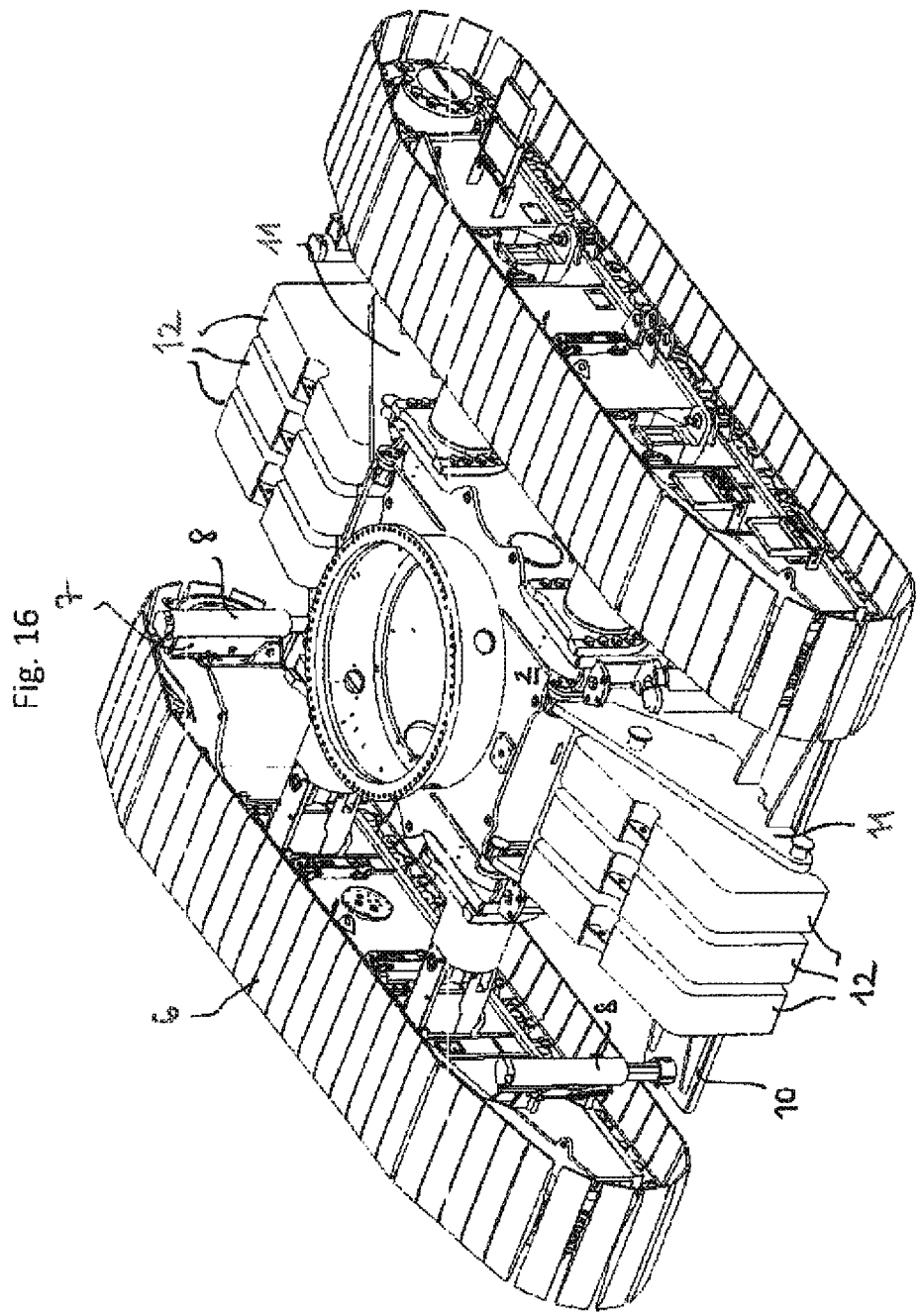

MOBILE MACHINE

BACKGROUND OF THE INVENTION

The present invention relates to a mobile machine and in particular deals with the enormous ground pressure obtained under the load of a mobile machine, for example a crawler crane.

The high ground pressure obtained under the load of a mobile machine is regarded as a decisive factor which is to be clarified prior to an operation of a mobile machine. In particular with a boom orientation of a crawler crane which is parallel to the longitudinal direction of the undercarriage or deviates therefrom by the angular amount of +/−30°, ground pressures occur which are two to three times as large as is the case with a boom orientation transversely to the undercarriage (and thus also transversely to the crawler supports). In extreme cases, ignoring or underestimating this high pressure variation or also the high ground pressures in general leads to accidents due to ground failure. In this case, the ground present under the crawler crane yields due to the too high ground pressure and in the unfavorable case makes the crawler crane tilt towards one side.

The high supporting pressure exerted on the ground by the crawler crane is due to the geometry of the tracklaying gear. In the two crawler supports aligned parallel to each other, the entire standing surface of the crawler is loaded uniformly in the case of a load acting transversely to said crawler supports (sidewards). In the case of a load acting longitudinally with respect to the crawler supports (forwards), no uniform, but a trapezoidal or triangular ground pressure distribution is obtained, which depends on the location of the center of gravity or center of pressure of the crawler crane. When the eccentricity of the center of pressure is greater than one sixth of the crawler standing surface, this even leads to the fact that a part of the standing surface of the crawler lifts off, which leads to a further increase of the maximum ground pressure. Such situation typically is obtained in the case of a large load moment with forwardly directed boom.

To avoid tilting of the crawler crane, considerations are made in the prior art to provide foldable support arms which increase the stability of the crane during the operation (cf. US 2010/0320166 A1 or CN 2308636 Y). Typically, the crawlers lift off with extended support arms, in order to prevent an undefined flux of force which depends on the rigidities of the support arms and the supporting structure or the crawler supports. In this implementation it is disadvantageous that the construction variants proposed in the prior art are very costly and expensive. In addition, the entire weight of the undercarriage is increased considerably, which involves additional disadvantages with regard to the transport and the assembly time of the crane. Moreover, the support arms protruding to the outside from the crawler crane require additional space, which is not easily available at any site of use.

SUMMARY OF THE INVENTION

It is the objective of the present invention to overcome the problems set forth above. In particular, the invention aims at reducing the ground pressures transmitted from a mobile machine to the ground at the site of use, which leads to a larger spectrum of use of the machine, as the spectrum of the admissible subsoils is increased. A mobile machine in particular is a crane or a piling and drilling rig.

This is accomplished with a mobile machine, for example a crawler crane or the like, which includes the features herein. Accordingly, the crawler crane according to the invention comprises an undercarriage with a crawler chassis or tracklaying gear, and an uppercarriage which is rotatably mounted with respect to the undercarriage, wherein the crawler chassis includes two crawler supports aligned parallel to each other, along whose longitudinal direction one crawler chain each is movably arranged. The mobile machine is characterized in that one cantilever arm each is provided on the inner sides of the crawler supports facing each other, and at the distal end of the respective cantilever arm a support cylinder is arranged. Preferably, the cantilever arm can be a fixed, foldable or pivotable or detachable cantilever arm.

By means of a mobile machine formed in this way or by means of a correspondingly formed undercarriage of the mobile machine it is possible to significantly reduce the ground pressure during an operation, as for example the two support cylinders can be mounted on a supporting plate, whereby a reduction of the maximum ground pressure is achieved. The resulting flux of force of the load moment on the ground still is effected via the crawler supports and thus is statically determinate, independent of the rigidities of the supporting structure of the undercarriage and the crawler supports. In addition, the cantilever arms protruding from the inner sides of the two crawler supports provide a small space which is occupied by the crawler crane during an operation.

Preferably, the support cylinder of each cantilever arm is retractable or extendable in a direction which can be orthogonal to a plane defined by the longitudinal directions of the two crawler supports. When the machine, e.g. a crawler crane, is oriented properly, the support cylinder accordingly is retractable or extendable vertically to a ground plane. This for example provides for positioning the machine such that a supporting plate present in the region between the two crawler supports aligned parallel to each other is utilized, so that the extended support cylinders can support on this plate. The ground pressure exerted on the subsoil by the machine thereby is reduced.

It can furthermore be provided that the positions of the respective cantilever arms are identical in longitudinal direction of the crawler support.

According to another optional modification of the invention the respective cantilever arm is attached to its associated crawler support via a rotary joint whose axis of rotation preferably is orthogonal to the plane defined by the longitudinal directions of the two crawler supports. This means that the cantilever arm is pivotable about a vertical axis when the machine is properly oriented. It thereby is possible to keep the space between the crawler supports free from spatial constraints, in case the cantilever arms are not required.

According to a preferred embodiment of the invention the machine furthermore comprises a supporting plate which includes connecting means for releasable connection with the support cylinders, wherein in the connected condition the supporting plate preferably is correspondingly movable with an extension or retraction of the support cylinders. The support cylinder can include corresponding connecting means for establishing a releasable connection with the plate.

During an operation of the machine the supporting plate is designed to be put down on the subsoil on which the machine is disposed. The maximum ground pressure exerted on the subsoil by the machine during the operation thereby is reduced. During a movement of the machine, the supporting plate can be lifted off the ground via the support cylinders connected with the supporting plate, so that the crane can be moved together with the plate.

Preferably, it is provided that the supporting plate connects the support cylinder of the one crawler support with the support cylinder of the other crawler support. Typically, the supporting plate connects the support cylinders of the two crawler supports, which are arranged on the identical longitudinal position of the crawler supports. The supporting plate is designed to reduce the ground pressure by connecting the one crawler support with the other crawler support via the support cylinders and the ground plate.

According to another optional modification of the invention the supporting plate partly or completely is arranged in a region between the two crawler supports aligned parallel to each other in a condition connected with the machine.

Preferably, the region between the two crawler supports aligned parallel to each other is delimited by a rectangle, in which two opposite sides of the rectangle correspond to the longitudinal inner sides of the two crawler supports. It thereby is ensured that the machine according to the invention has compact dimensions during its use and is not limited in its operability.

According to another embodiment of the present invention, the machine furthermore comprises a ballast, wherein the ballast is arranged on the supporting plate which is connected with the machine via the support cylinders. Preferably, the ballast serves as central ballast on the undercarriage. By ballasting the supporting plates, the central ballast of a machine, e.g. in a crawler crane, is mountable particularly advantageously. In particular, the assembly of the central ballast or the ballast units on the supporting plate is to be carried out in a simple way, as the supporting plate with the ballast arranged thereon merely is to be deposited on a subsoil and the machine can pick up the supporting plate on its own by means of its movable support cylinders. For this purpose, the machine simply moves into the corresponding position and connects the support cylinders with the supporting plate itself via the connecting means of the supporting plate and/or the connecting means of the support cylinders. The assembly of the ballast or the supporting plate accordingly is very easy.

According to another development of the invention the two crawler supports of the machine can be divided into a first front portion and a second rear portion centrally in their longitudinal direction, wherein cantilever arms arranged on opposite inner sides with their associated support cylinder are present both in the first front portion and in the second rear portion. Hence, it now is possible in general to provide one supporting plate each in the first front portion and in the second rear portion, which typically are separated from each other by a middle part, which connects the two crawler supports with each other, which supporting plate each connects the crawler supports aligned parallel to each other via the corresponding support cylinders and cantilever arms.

With this configuration it is possible to further reduce the ground pressure.

Preferably, a first supporting plate for the cantilever arms in the first front portion and a second supporting plate for the cantilever arms in the second rear portion are provided. In a preferred embodiment, the first and the second supporting plate are connected with the associated cantilever arms via the corresponding support cylinders.

BRIEF DESCRIPTION OF THE DRAWINGS

Further features, details and advantages of the invention will become apparent with reference to the following detailed discussions of the Figures, in which:

FIG. 8 shows a top view of a part of the crawler crane of the invention according to another embodiment, FIG. 10 shows a perspective view of a crawler crane according to the invention obliquely from the front, FIG. 16 shows a perspective view of the undercarriage of the mobile machine according to the invention with a connected supporting plate in the fully ballasted condition.

DESCRIPTION OF THE PREFERRED EMBODIMENTS

Figure 1:
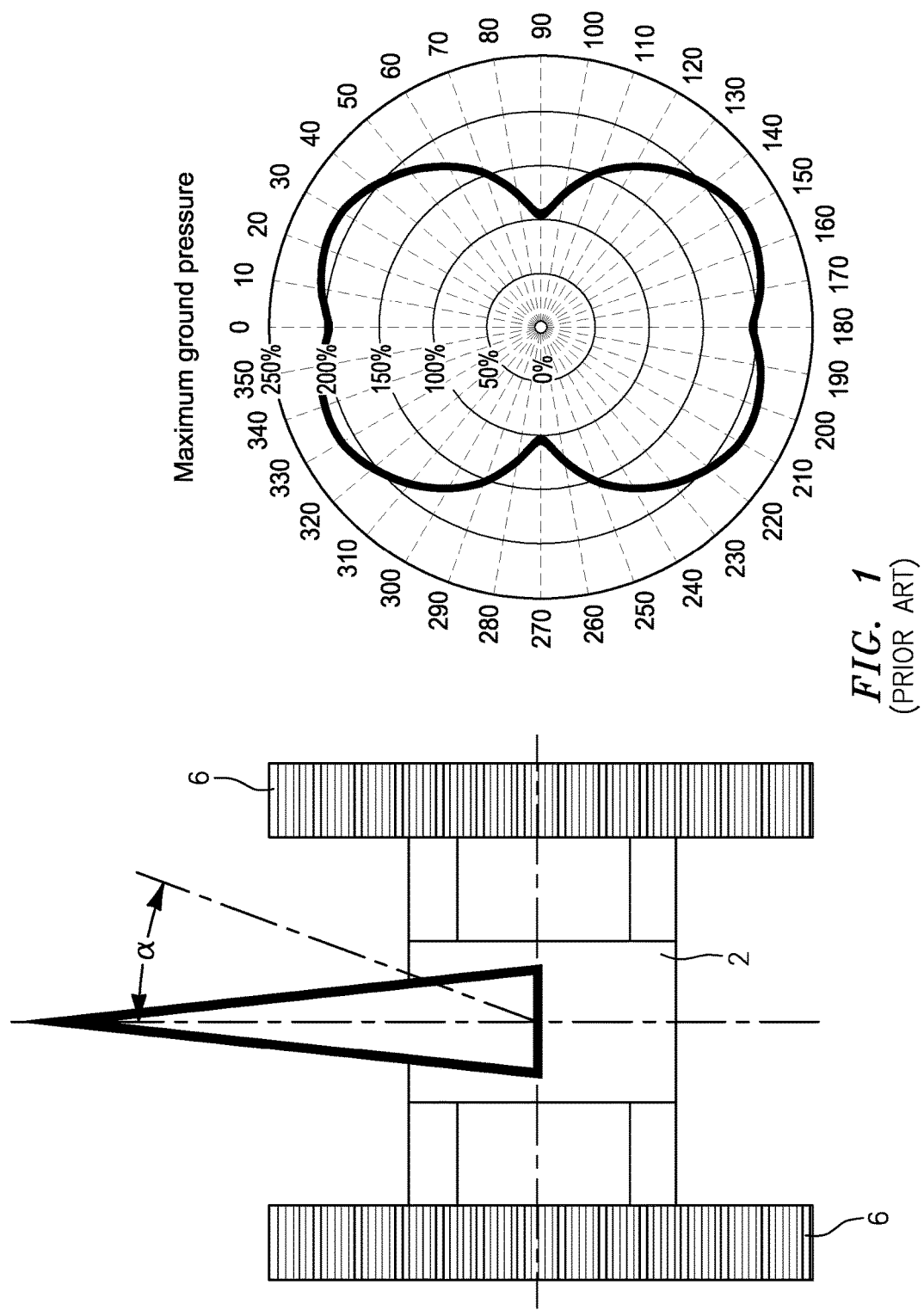
FIG. 1 shows a diagram to explain the maximum ground pressure of a conventional crawler crane, during a 360° rotation of the uppercarriage.

FIG. 1 shows a representation which illustrates the maximum ground pressure, i.e. the pressure which is exerted on the ground by the crawler crane placed thereon. On the left side it can be seen that the crane configuration present here is one from the prior art. The triangle arranged parallel to the two crawler supports points towards the front and indicates an alignment of the crane boom at 0°. The 0° position here represents an alignment of the crane boom into an orientation towards the front parallel to the two crawler supports. A rotation of the boom about an axis vertical to the ground plane describes the boom angle $\alpha$, wherein for each boom angle $\alpha$ a specific ground pressure value is represented in the diagram shown on the right.

It can be seen here that the minimum of the maximum ground pressure is reached at a deviation of 90° about the alignment to the front (0°) or to the rear (180°). This results from the fact that the load occurring thereby is applied transversely to the crawler supports (sidewards) and thus the entire standing surface of the crawler is uniformly loaded. In the diagram shown on the right, this ground pressure existing at 90° or 270° is designated with 100%. Furthermore, the diagram reveals that the maximum ground pressure occurs at a deviation of about 20° with respect to the boom direction to the front (0°) or to the rear (180°). The maximum ground pressure here is more than twice as large as with a load transversely to the crawler supports (90° or 270°). The maximum ground pressure obtained for example at 20° is the maximum ground pressure given to the subsoil by one of the two crawlers. It can be seen that the ground pressure varies very much in dependence on the boom angle α and at a working range over the entire boom angle a ground pressure occurs which is more than twice as large as with a boom orientation transversely to the crawler supports. In the case of a change of the boom angle α, this large variance of the maximum ground pressure often leads to unexpected yielding of the ground and thereby causes a ground failure, which in the extreme case can lead to tipping of the machine.

Figure 2:
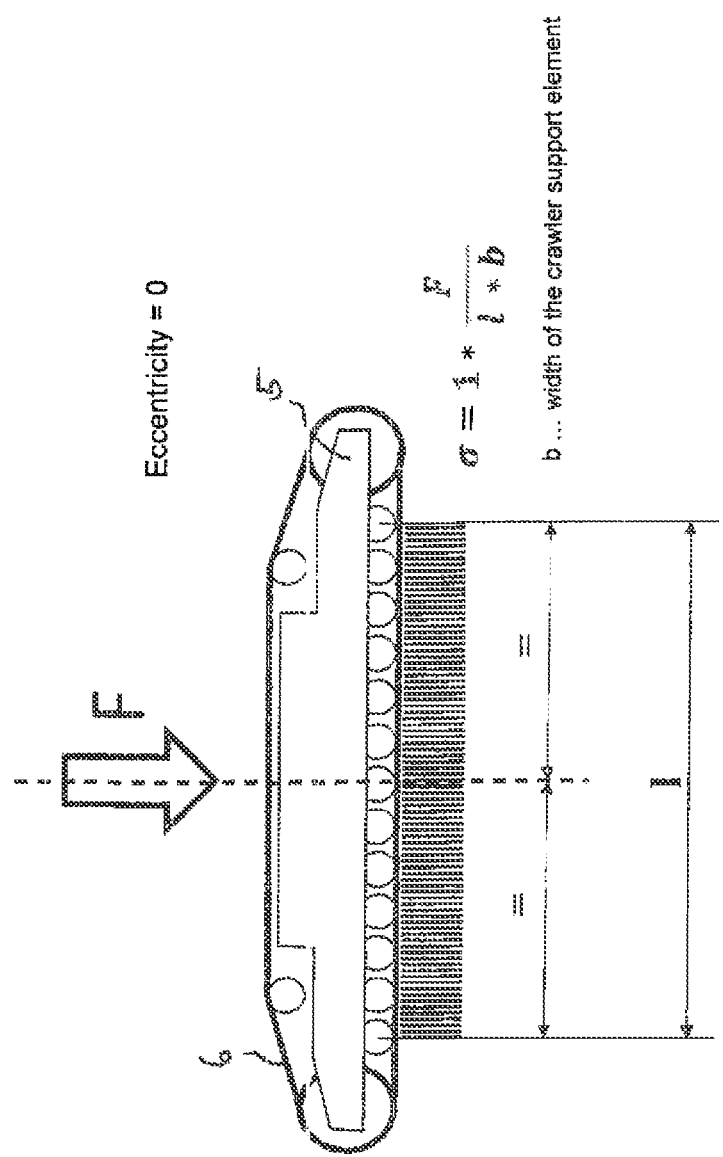
FIG. 2 shows a representation of the ground pressure distribution with a force acting centrally on a crawler.

FIG. 2 shows the distribution of the ground pressure on application of a force centrally along the longitudinal direction of the crawler. The crawler support 5 has a crawler chain 6 movable in its longitudinal direction. When the force acting on the crawler is arranged centrally with respect to the length of the crawler support, the pressure is uniformly passed on to the ground arranged under the crawler. This is represented by the equally sized dashes arranged under the crawler. The eccentricity of the force acting on the crawler in longitudinal direction here is 0, as there is no deflection about the center along the longitudinal direction of the crawler.

In operation of a crawler crane, the condition shown in FIG. 2 occurs at a boom position of 90° and 270°, respectively. The boom hence is disposed transversely to the longitudinal direction of the two crawler supports or in a normal plane intersecting the center of the side members.

The force is uniformly passed on to the ground via the standing surface I.

Figure 3:
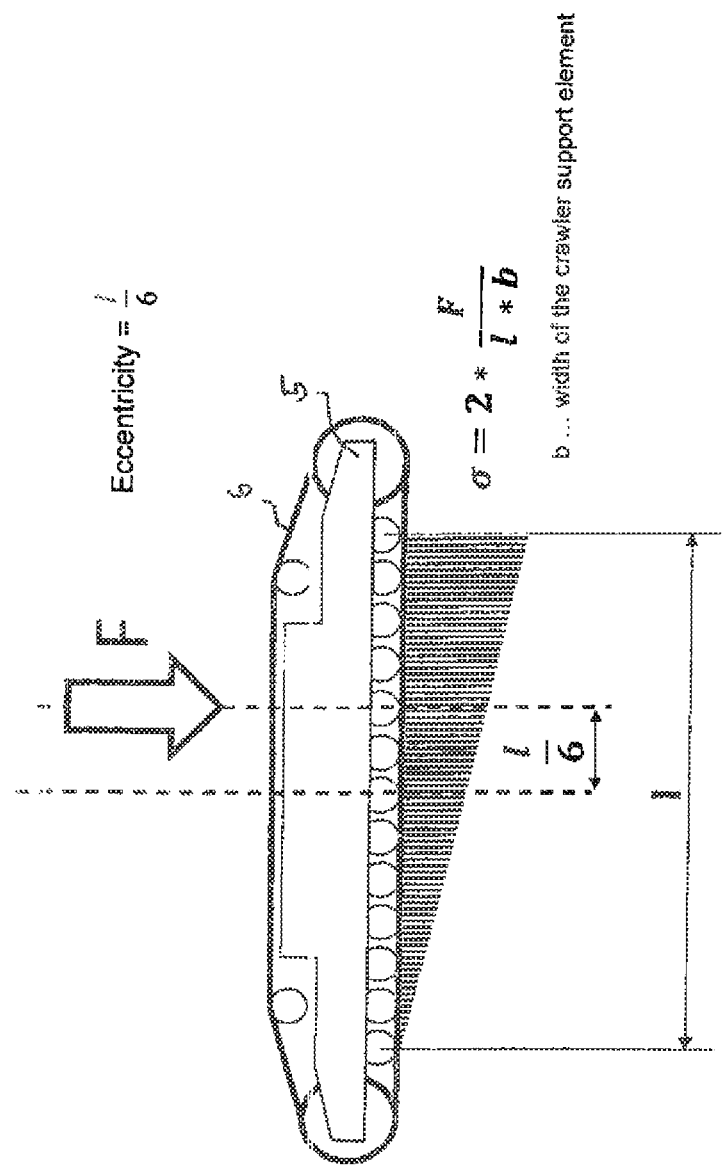
FIG. 3 shows a representation of a ground pressure with a force acting on a crawler offset from the center.

FIG. 3 shows a condition in which the force acting on the crawler is offset from the center by ⅙ of the standing surface (also bearing length). It can be seen that the ground pressures continuously increase along the longitudinal direction of the crawler support, namely in direction of the end of the crawler closer to the force input point.

Figure 4:
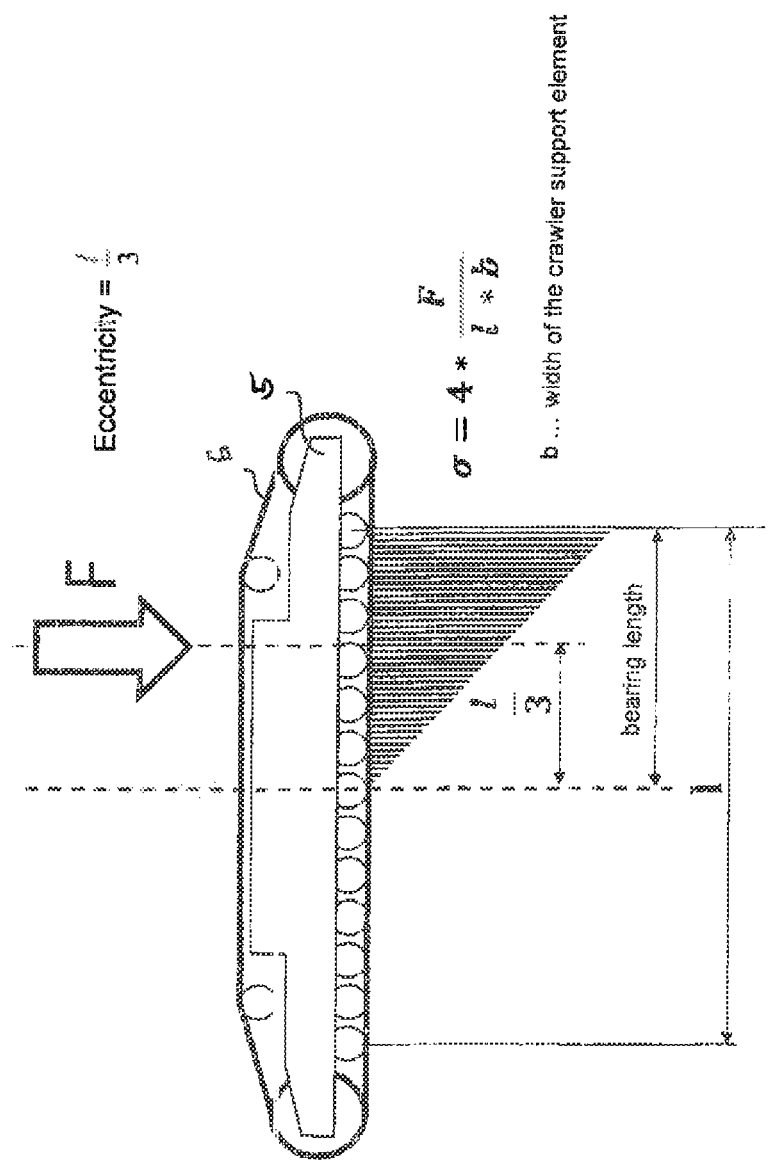
FIG. 4 shows a representation of the ground pressure with a force acting on a crawler greatly offset from the center.

FIG. 4 shows a further displacement of the force from the center of the crawler. The force acting on the crawler now is offset from the center by one third of the bearing length of the crawler. It can be seen that the bearing length of the crawler, i.e. the region which passes the force on into the ground, has halved as compared to the preceding FIGS. 2 and 3. It can also be seen that the end of the crawler remote from the force input point possibly makes a small movement away from the ground. In this configuration, the maximum ground pressure is greatest and might occur for example at a boom angle of about 20°, 160°, 200° or 340°.

Figure 5:
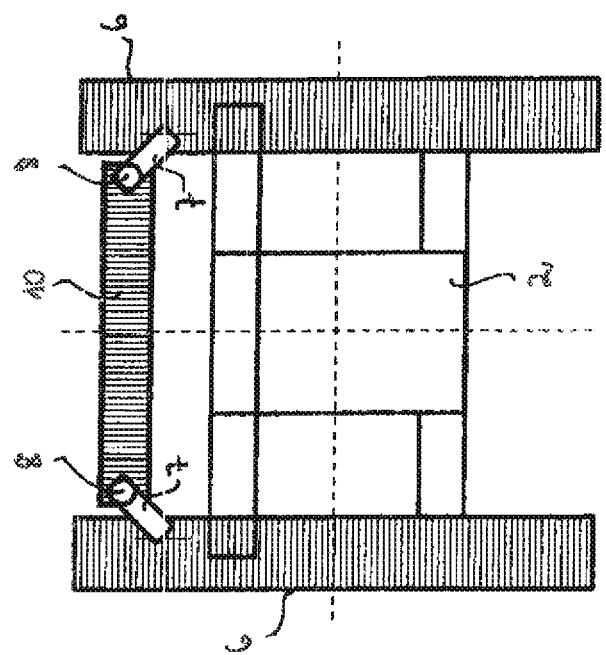
FIG. 5 shows a top view of a part of the crawler crane according to the invention.

FIG. 5 shows a top view of a sketch of the undercarriage of the crawler crane according to the invention. Beside the crawler chain 6 movable in longitudinal direction on the crawler support 5, there is each shown a cantilever arm 7 on the inner sides of the crawler supports 5 facing each other. At the end spaced from the crawler support 5 each of the cantilever arms 7 has a support cylinder 8 which is connected with a supporting plate 10. The supporting plate 10 connects the support cylinders 8 mounted on the different crawler supports. The provision of a supporting plate as described above reduces the ground pressure in operation of the crawler crane.

Figure 6:
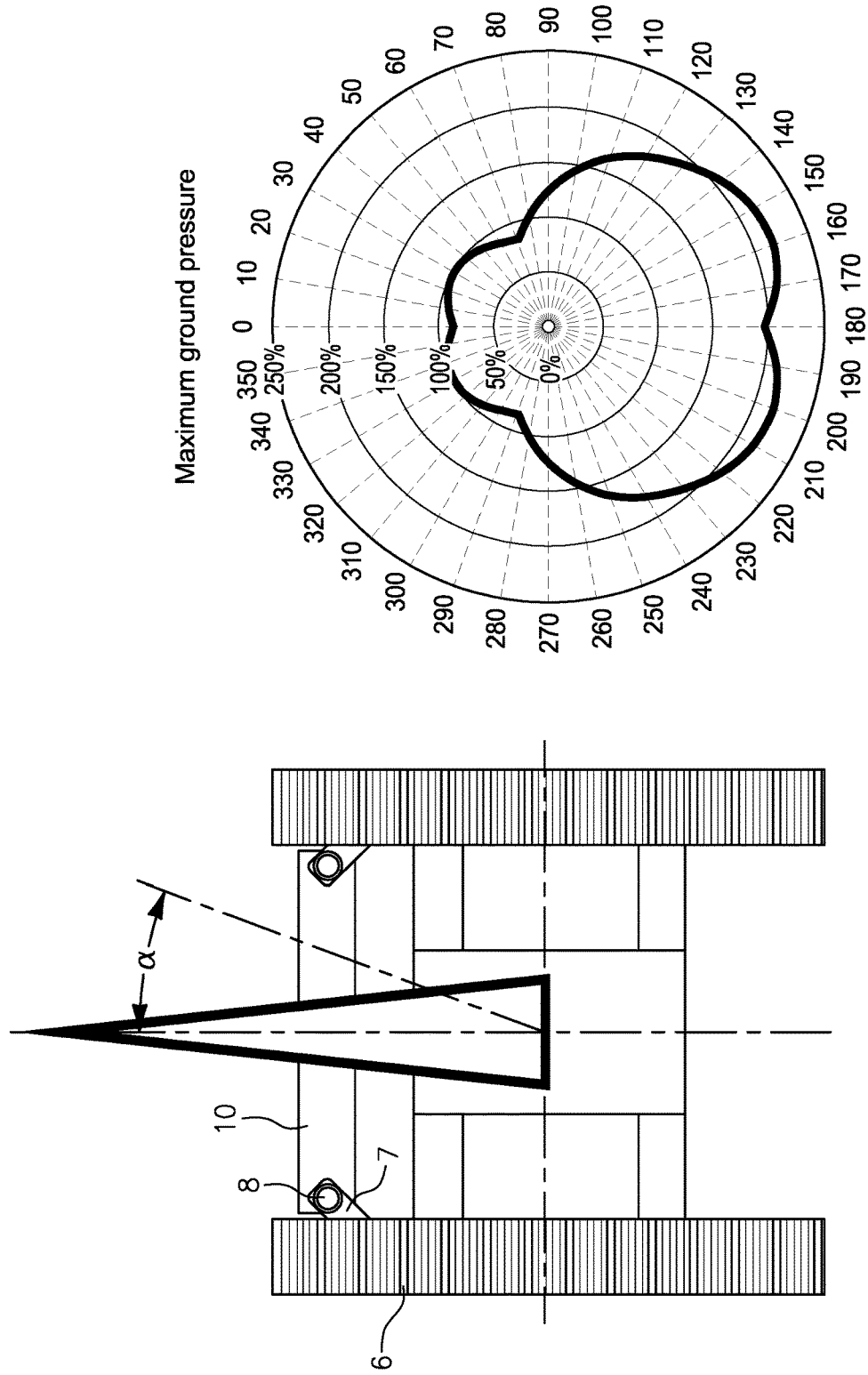
FIG. 6 shows a diagram to explain the maximum ground pressure in a crawler crane according to the invention.

FIG. 6 shows the diagram of the maximum ground pressure over a full rotation of the boom. A look at the diagram reveals that on sweeping of the boom from the side of the crawler crane which is provided with a supporting plate 10, the maximum ground pressure decreases significantly. This is equivalent to a reduction of the ground pressure exerted by the crawler crane. At a boom angle of 0° the ground pressure is reduced to about 85%, whereas in the configuration without supporting plate 10 the same was at about 190%. For the side of the crawler crane which has no supporting plate, no improvements are obtained as compared to a conventional crawler crane.

Figure 7:
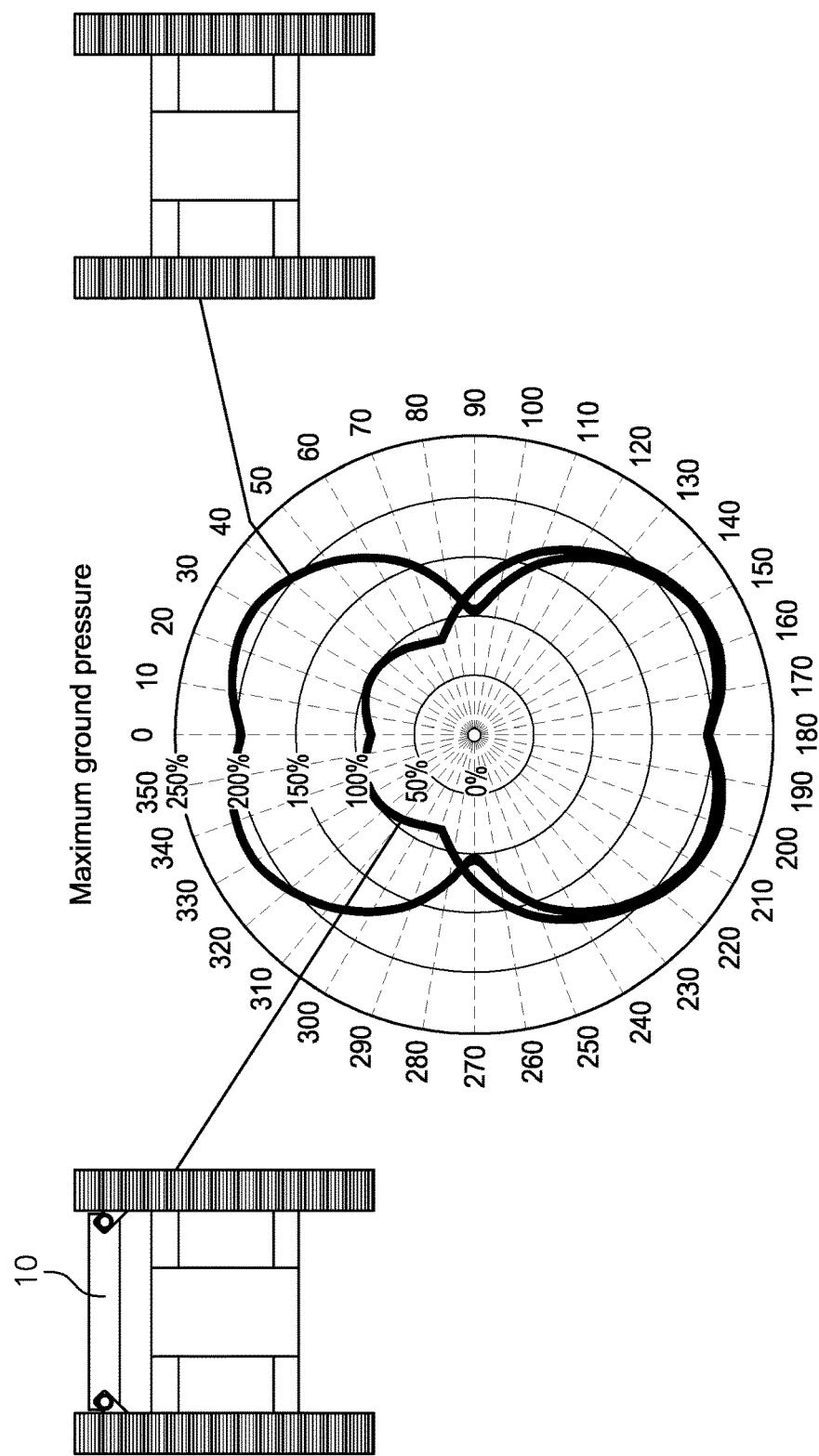
FIG. 7 shows a diagram to simultaneously represent the maximum edge pressures of a conventional crawler crane and the crawler crane according to the invention.

FIG. 7 shows a diagram in which a crawler crane without supporting plate is compared with a crawler crane with supporting plate. It can very well be seen here that in a range of ±85° about the boom angle α=0 the crawler crane with supporting plate exerts a very much smaller maximum ground pressure on the subsoil. In a range of ±85° to 120° about the angle α=0, the ground pressure of the crawler crane provided with the supporting plate is slightly larger than that of the crawler crane without supporting plate, before the two diagram lines merge into each other in a range of ±120° to 180° about the boom angle α=0.

FIG. 8 shows another embodiment of the present invention, in which a crawler crane according to the invention both in a front and in a rear region is provided with cantilever arms 7 with a support cylinder 8 arranged thereon, which are connected with a respective supporting plate 10.

Figure 9A:
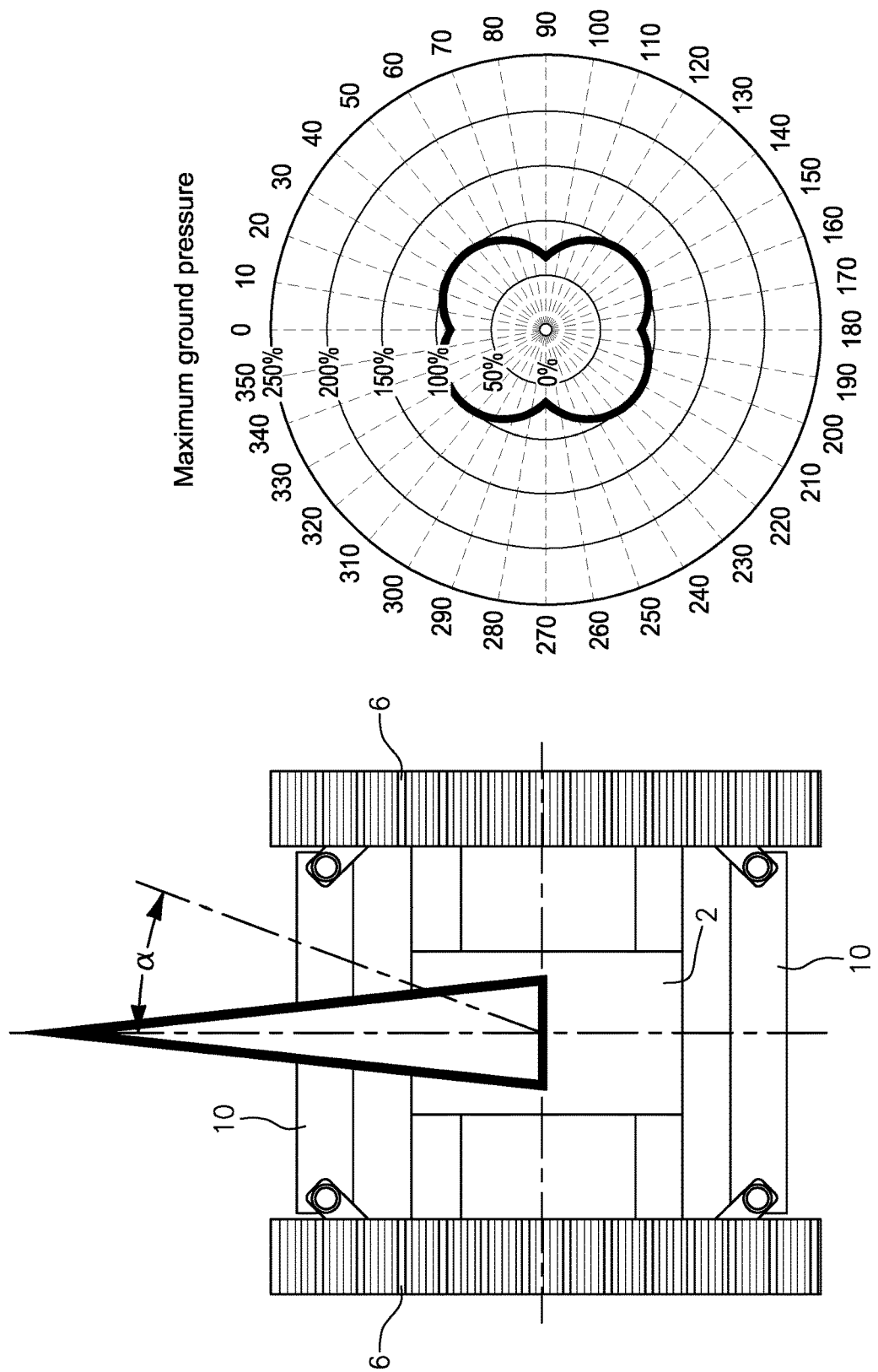
FIG. 9a shows a diagram to illustrate the maximum ground pressure of the crawler crane of the invention according to another embodiment.

FIG. 9a shows the corresponding diagram of the maximum ground pressure beyond the boom angle for the second embodiment of the crawler crane with a supporting plate both in the front and in the rear region of the tracklaying gear.

A look at the associated diagram reveals already that the maximum ground pressure is smaller as compared to a crawler crane without supporting plate over all boom angles.

Figure 9B:
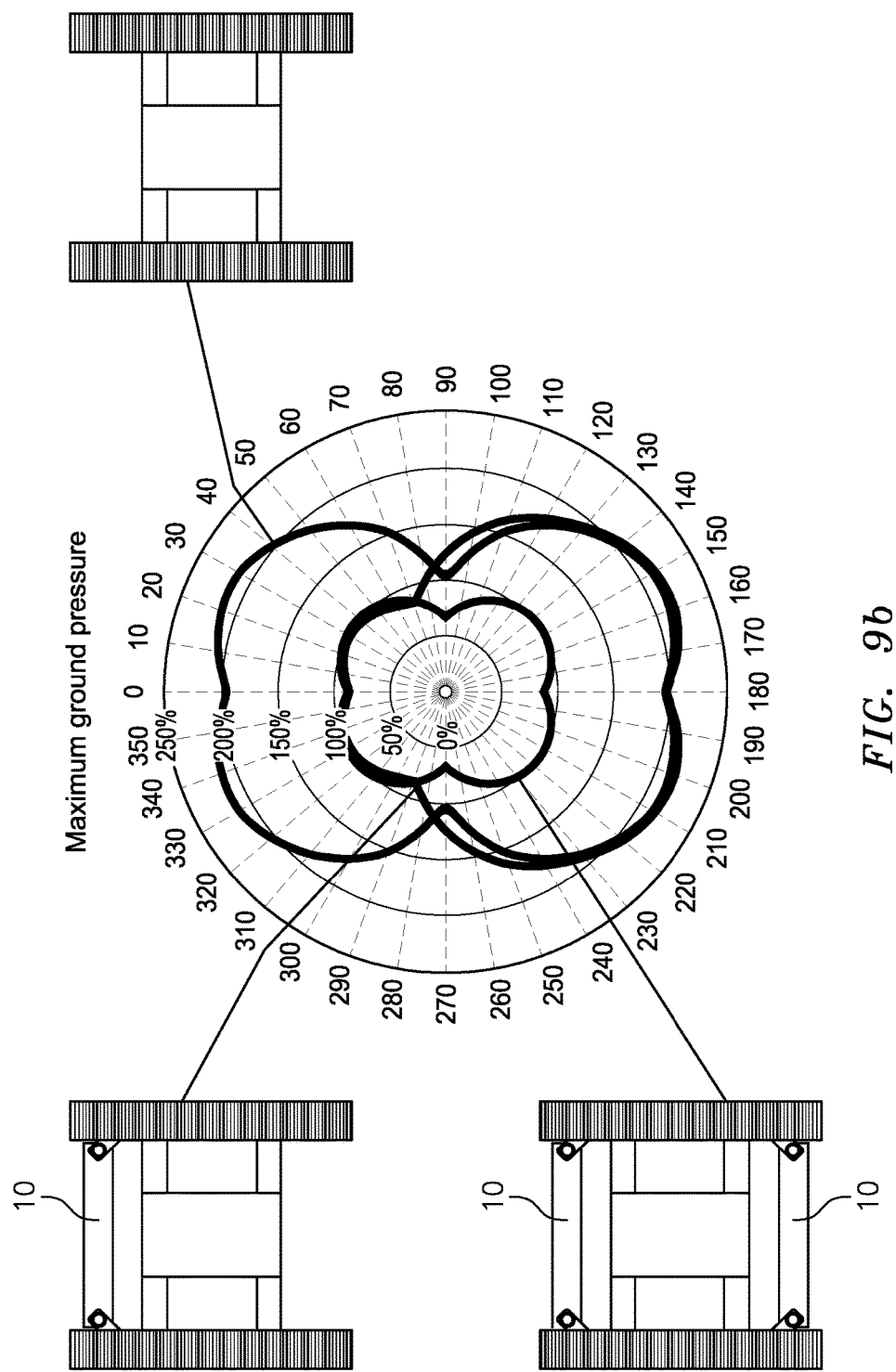
FIG. 9b shows a diagram to compare the maximum ground pressure of a conventional crawler crane and the crawler cranes according to the embodiments of the invention.

FIG. 9b shows a comparison of the crawler crane configurations discussed so far with their maximum ground pressure diagram.

FIG. 10 shows a perspective view of a crawler crane according to the invention, in which the crawler crane 1 is just arranged such that between its two crawler supports 5 a supporting plate 10 is arranged. The respective support cylinders 8 still are in a retracted position and have not yet connected with the supporting plate 10 lying on the ground. This will happen only upon extension of the support cylinder in direction of the supporting plate 10.

Figure 11:
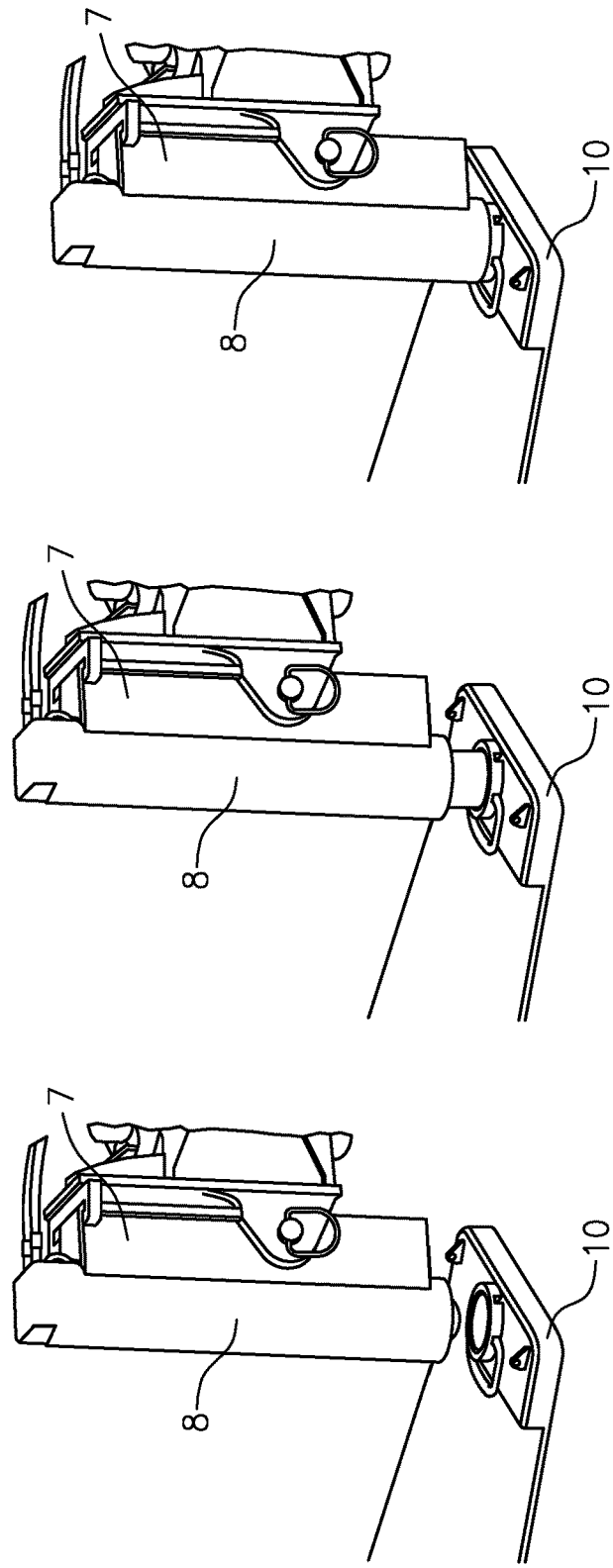
FIG. 11 shows a detail view of the support cylinder and the supporting plate connectable with the same.

FIG. 11 shows the process of extension of the support cylinder 8, wherein the left representation shows the support cylinder 8 in a retracted position and the middle representation shows the support cylinder 8 in an extended condition. In the extended condition, the support cylinder 8 connects with the supporting plate 10 in a releasable way. When the support cylinder 8 however is connected with the supporting plate 10, a retraction of the support cylinder 8 leads to the supporting plate 10 being lifted, as is shown in the right-hand representation of FIG. 11. This possibly is advantageous during the assembly of the crawler crane and when the crawler crane is moved before an operation. Above all, ballasting of the mobile machine can be carried out in a simple way, in that the supporting plate is equipped with a ballast at a place remote from the machine, preferably by the machine itself, and the ballast then is accommodated by coupling the supporting plate with the machine.

Figure 12:
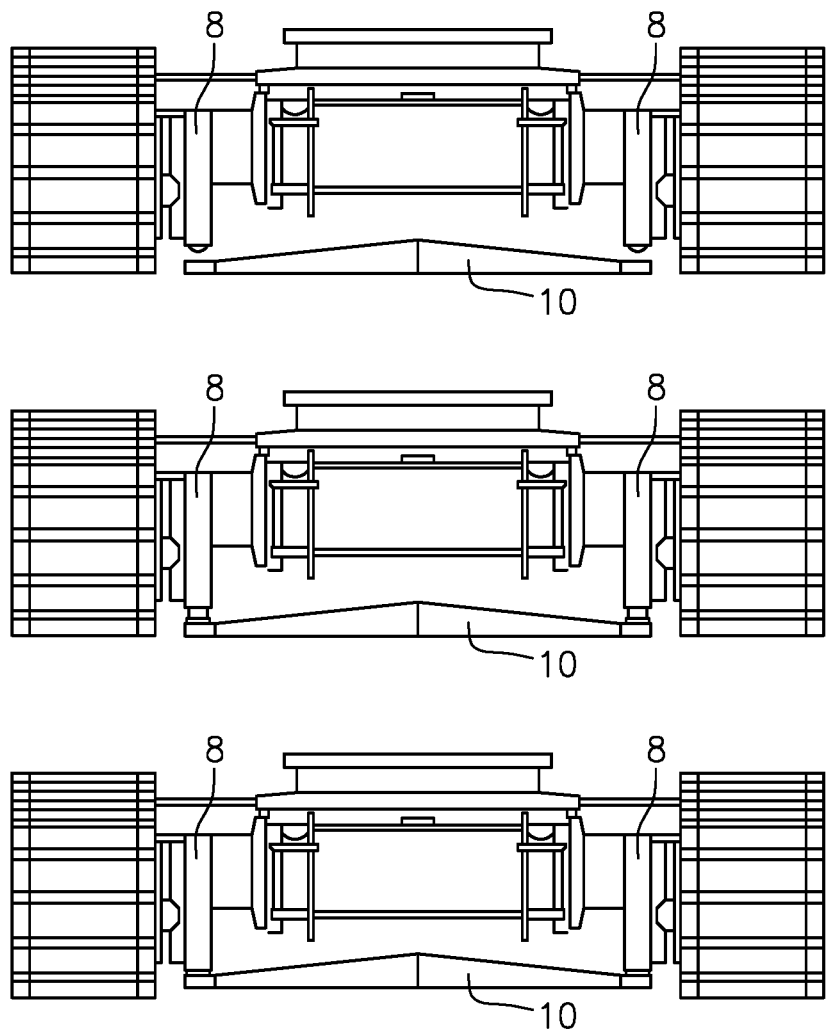
FIG. 12 shows a front view of the machine according to the invention, which illustrates the movability of the supporting plate coupled with the support cylinder.

FIG. 12 shows a front view of an undercarriage of the machine according to the invention, wherein the upper representation shows the condition in which the supporting plate 10 is decoupled from the support cylinders 8 and the support cylinder 8 is in a (partly) retracted condition.

The middle representation of FIG. 12 shows the support cylinders in an extended condition, so that the same are coupled with the supporting plate 10 arranged on the ground. In this condition, a support of the mobile machine on the supporting plate is possible.

The lower representation of FIG. 12 shows the supporting plate in a coupled condition with the support cylinders. In addition, the cylinders are retracted, so that the mobile machine can be moved together with the supporting plate. By retracting the cylinders 8, the supporting plate 10 also is lifted off the ground.

Figure 13:
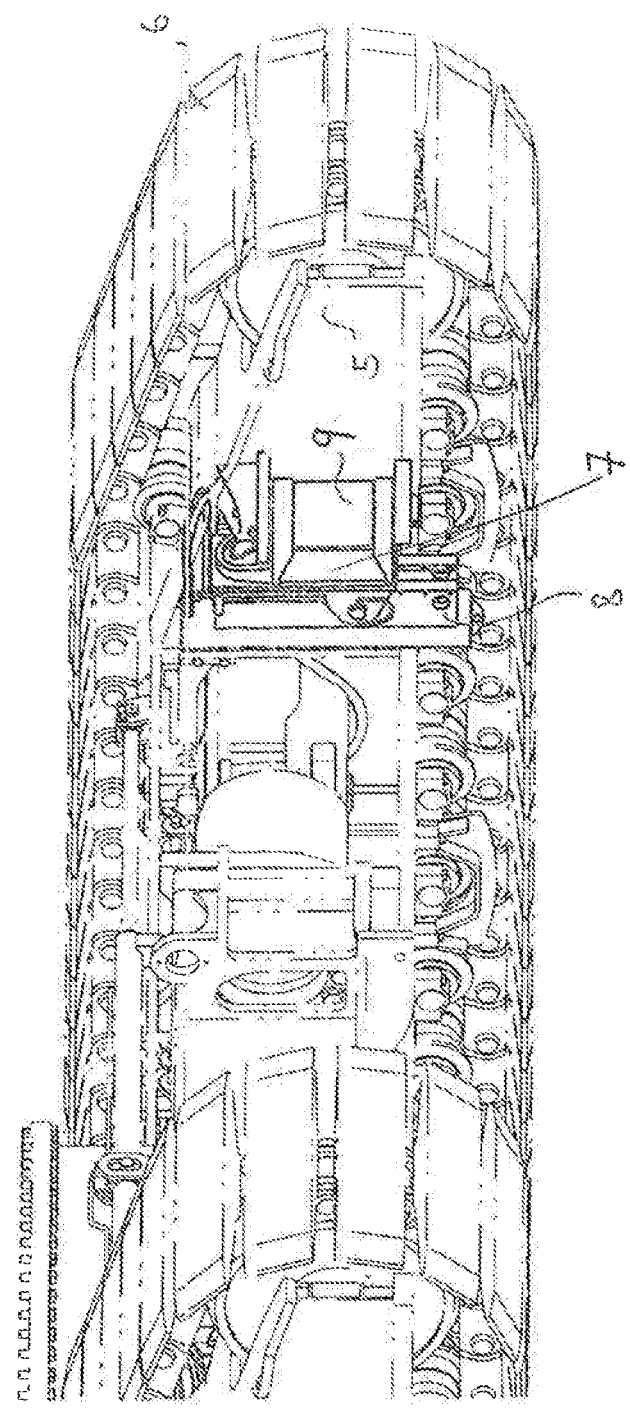
FIG. 13 shows a perspective partial view of the crawler crane according to the invention.

FIG. 13 shows a perspective representation which in detail shows an inner side of a crawler support and the cantilever arm 7 arranged thereon. It can be seen that the cantilever arm 7 is articulated to the crawler support via a large rotary joint 9 whose axis of rotation is aligned vertically when the crawler crane is properly oriented. At the end of the cantilever arm 7 spaced from the rotary joint 9 the support cylinder 8 is attached, which is formed to be movable in direction of the ground. It here is advantageous that in non-use of the cantilever arms or of the cantilever arm the same can be swivelled into a space-saving position, as it is shown in FIG. 13.

Figure 14:
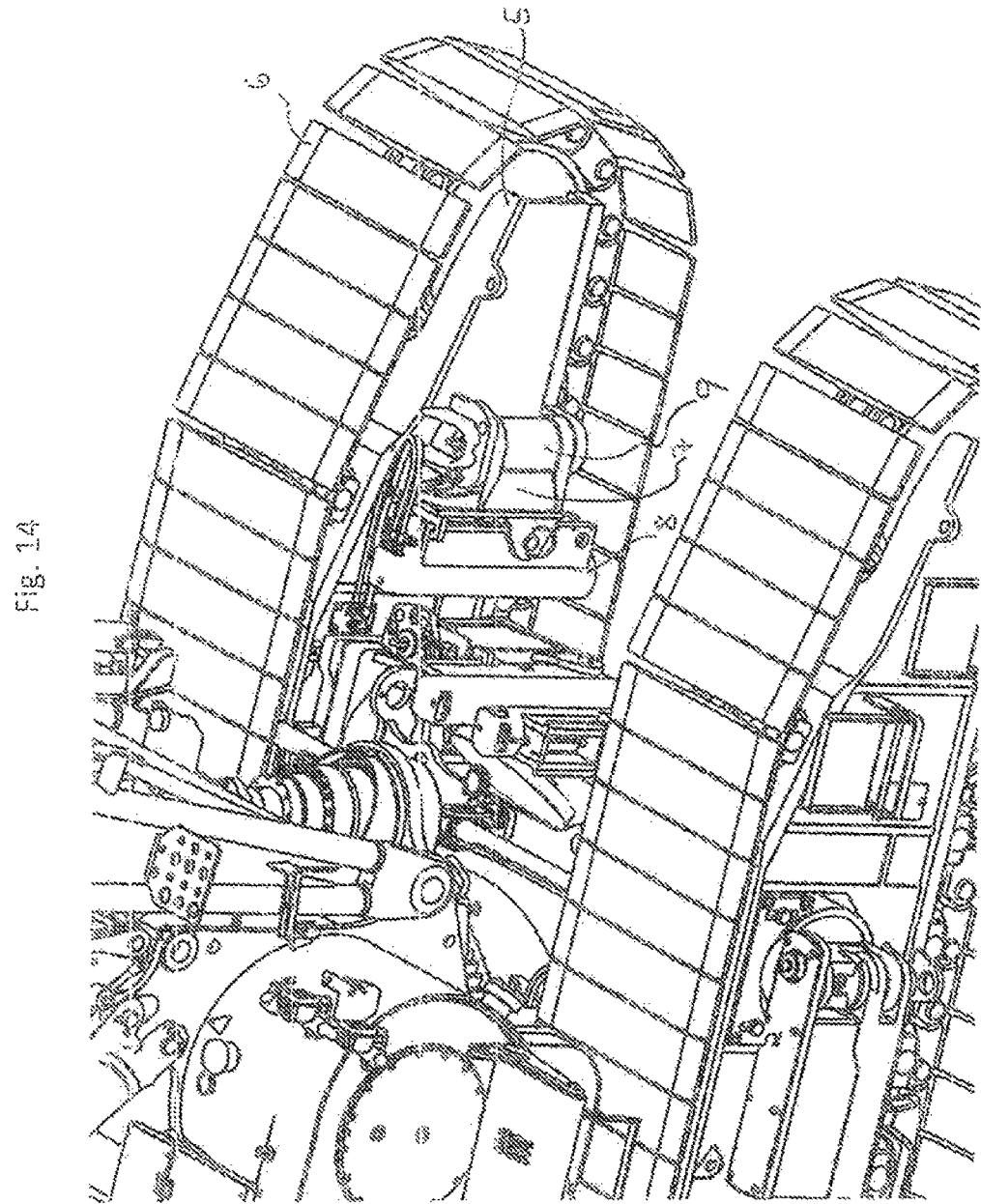
FIG. 14 shows a detail view of the cantilever arm arranged on a crawler support with support cylinder.

FIG. 14 again shows a detail view of the cantilever arm and of the support cylinder 8 arranged thereon in a view obliquely from above. The cantilever arm can accommodate the support cylinder 8 via a plug-in bolt connection, which can be released in the case of a necessary repair or the like.

Figure 15:
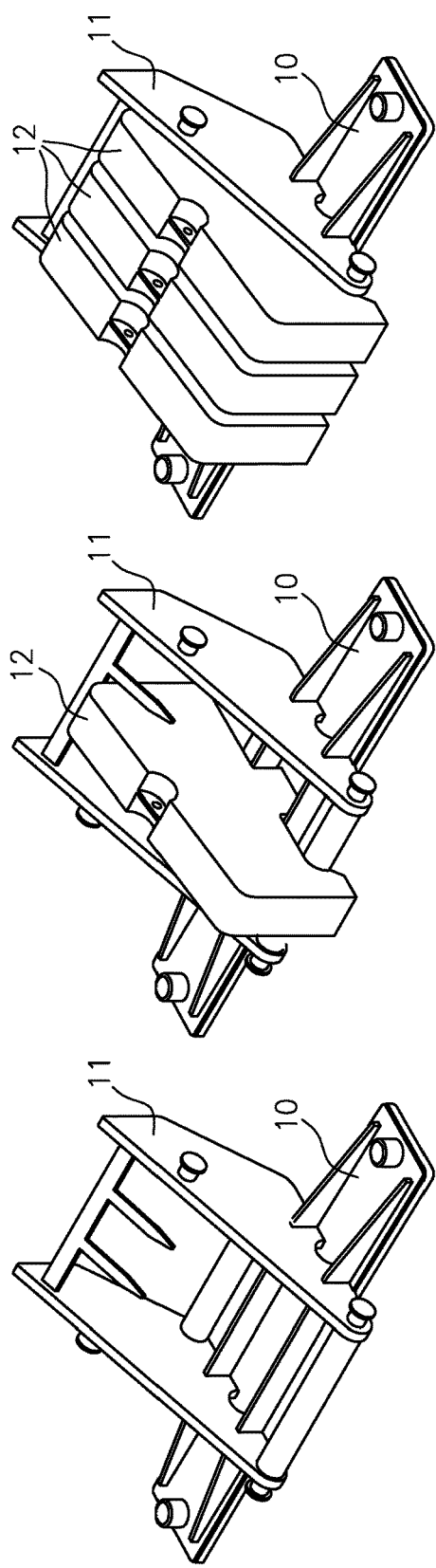
FIG. 15 shows a perspective view of a supporting plate with a holder for a ballast.

FIG. 15 shows several perspective views of a supporting plate 10 with a holder 11 for a ballast 12. In the left representation it can be seen that no ballast element 12 yet is present in the holder 11. In the middle representation one of a maximum of three possible ballast elements 12 is shown in the holder 11, whereas the right representation shows a holder 11 of the supporting plate 10, in which all three arrangement positions for ballast elements 12 are occupied. In this configuration the supporting plate 10 is provided with its maximum number of ballast elements 12 (so-called fully ballasted condition).

The holder 11 is shaped such that at least one ballast element 12 can be accommodated. Preferably, the holder 11 can accommodate up to three plate-shaped ballast elements 12. According to another development of the invention, the holder 11 is formed such that a ballast element 12 can be arranged centrally in the supporting plate 10.

As shown in FIG. 15, the ballast elements 12 can have a plate-shaped basic structure and can be positioned side by side in the holder 11 on their flat long side. It is advantageous when there is an odd number of accommodation spaces of the holder 11 for the ballast elements 12, so that with the central arrangement of already one ballast element 12 a ballast well balanced in width direction then is present.

FIG. 16 shows a perspective view of the undercarriage of the machine 1 according to the invention, in which the supporting plate 10 is coupled with the support cylinders 8. It can also be seen that not only on the front side of the undercarriage but also on the rear side of the undercarriage a supporting plate 10 is present, both of which are provided with ballast elements 12, which are arranged in a respective holder 11 of the supporting plates 10. The holders 11 accommodate the maximum number of ballast elements 12, so that the supporting plates 10 are in the fully ballasted condition.

The invention claimed is:

1. A crawler-mounted mobile machine (1), comprising:
an undercarriage (2) with a tracklaying gear (3),
an uppercarriage (4) which is rotatably mounted with respect to the undercarriage (2),
tracklaying gear (3) including two crawler supports (5) aligned parallel to each other and extending along a longitudinal direction, and two crawler chains (6), with each said crawler chain (6) movably arranged about a respective crawler support (5),
one cantilever arm (7) each provided on inner sides of the crawler supports (5) facing each other,
at a distal end of the respective cantilever arm (7), a support cylinder (8) being arranged, and
a supporting plate (10) which includes connecting means for releasable connection with the support cylinders (8) and interconnecting the longitudinally extending supports (5), such that in connected condition,
the supporting plate (10) is retractable and extendable correspondingly with movement of the support cylinders (8), and
the supporting plate (10) extends from one of the cantilever arms (7) to another of the cantilever arms (7), wherein
the supporting plate (10) reduces around pressure by interconnecting the crawler supports (5) with one another via the support cylinders (8) and the cantilever arms (7).

2. The mobile machine (1) according to claim 1, wherein the support cylinder (8) is retractable and extendable in a direction which is orthogonal to a plane defined by the longitudinal directions of the two crawler supports (5).

3. The mobile machine (1) according to claim 1, wherein the cantilever arm is (7) attached to its associated crawler support (5) via a rotary joint (9) whose axis of rotation is orthogonal to the plane defined by the longitudinal directions of the two crawler supports (5).

4. The mobile machine (1) according to claim 1, wherein the supporting plate (10) in the condition connected with the crawler crane (1), partly or completely is arranged in a region between the two crawler supports (5) aligned parallel to each other.

5. The mobile machine (1) according to claim 4, wherein the region between the two crawler supports (5) aligned parallel to each other is delimited by a rectangle, in which two opposite sides of the rectangle correspond to two longitudinal inner sides of the two crawler supports (5).

6. The mobile machine (1) according to claim 1, wherein the two crawler supports (5) can be divided into a first front portion and a second rear portion centrally in their longitudinal direction, and the at least two cantilever arms (7) arranged on opposite inner sides with their associated support cylinder (8) are present both in the first front portion and in the second rear portion.

7. The mobile machine (1) according to claim 6, wherein a first supporting plate (10) for the cantilever arms (7) is provided in the first front portion and a second supporting plate (10) for the cantilever arms (7) is provided in the second rear portion, and the first and the second supporting plates (10) are connected with the associated cantilever arms (7) via the corresponding support cylinders (8).

8. A crawler-mounted mobile machine (1), comprising:
an undercarriage (2) with a tracklaying gear (3),
an uppercarriage (4) which is rotatable mounted with respect to the undercarriage (2),
tracklaying gear (3) including two crawler supports (5) aligned parallel to each other and extending along a longitudinal direction, and two crawler chains (6), with each said crawler chain (6) movably arranged about a respective crawler support (5),
one cantilever arm (7) each provided on inner sides of the crawler supports (5) facing each other, at a distal end of the respective cantilever arm (7), a support cylinder (8) being arranged, and a ballast (12), wherein the ballast (12) is arranged on a supporting plate (10) which is connected with the crawler crane (1) via the support cylinders (8) and serves as central ballast on the undercarriage (2), and the ballast (12) is insertable into a holder (11) attached to the supporting plate (10).

\* \* \* \* \*